United States Patent [19]

White

[11] 4,124,192

[45] Nov. 7, 1978

[54] TIME DELAY SOLENOID OPERATED VALVE

[75] Inventor: Thomas G. White, Troy, Mich.

[73] Assignee: Ambac Industries Incorporated, Troy, Mich.

[21] Appl. No.: 772,348

[22] Filed: Feb. 28, 1977

[51] Int. Cl.² ............................................. F16K 31/06
[52] U.S. Cl. ..................................... 251/129; 251/176
[58] Field of Search ....................... 251/129, 176, 195

[56] References Cited

U.S. PATENT DOCUMENTS

| 1,324,351 | 12/1919 | Haynes | 251/195 X |
|---|---|---|---|
| 1,654,642 | 1/1928 | Geissinger | 251/195 X |
| 2,828,937 | 4/1958 | Kreitchman | 251/129 |
| 3,254,871 | 6/1966 | Limon | 251/129 |
| 3,446,473 | 5/1969 | Barker | 251/129 X |
| 3,906,294 | 9/1975 | Lourigan | 251/129 X |
| 3,917,220 | 11/1975 | Gilmore | 251/176 X |

*Primary Examiner*—Arnold Rosenthal
*Attorney, Agent, or Firm*—McGlynn and Milton

[57] ABSTRACT

A valve assembly including a housing having an inlet passage in communication with an outlet passage with valve seat members disposed in the passages on opposite sides of the lower end of a plunger. The plunger has a bore therein for receiving a pair of valve sealing elements which are biased apart by a spring for engagement with the valve seat members. The plunger is biased to the closed position by a spring and is moved to the open position by the magnetic field generated by the coil of a solenoid. The solenoid coil is disposed about a plastic bobbin which is, in turn, disposed about a nonmetallic tube which is inserted into a counterbore in the housing. A plunger seat member having a conical lower end for engaging the plunger is soldered within the nonmetalic tube and includes a head abutting the upper end of the tube and the upper end of the bobbin. A wave-like washer is disposed adjacent the bottom of the bobbin for urging the bobbin upwardly against the head of the plunger seat member. A casing is disposed about the solenoid assembly and includes a cover secured to the head of the plunger seat member by a fastener threaded into the plunger seat member. A circuit is disposed within the casing and includes a resistor in series with a capacitor with both the resistor and capacitor in parallel with the coil of the solenoid and with a power source so that when the solenoid is actuated by electrical power the capacitor is charged through the resistor. Upon the termination of the electrical power from the power source, the capacitor will discharge through the resistor to the coil of the solenoid to maintain the plunger in the open position for a predetermined period of time immediately after the termination of electrical power, i.e., as the capacitor discharges.

18 Claims, 2 Drawing Figures

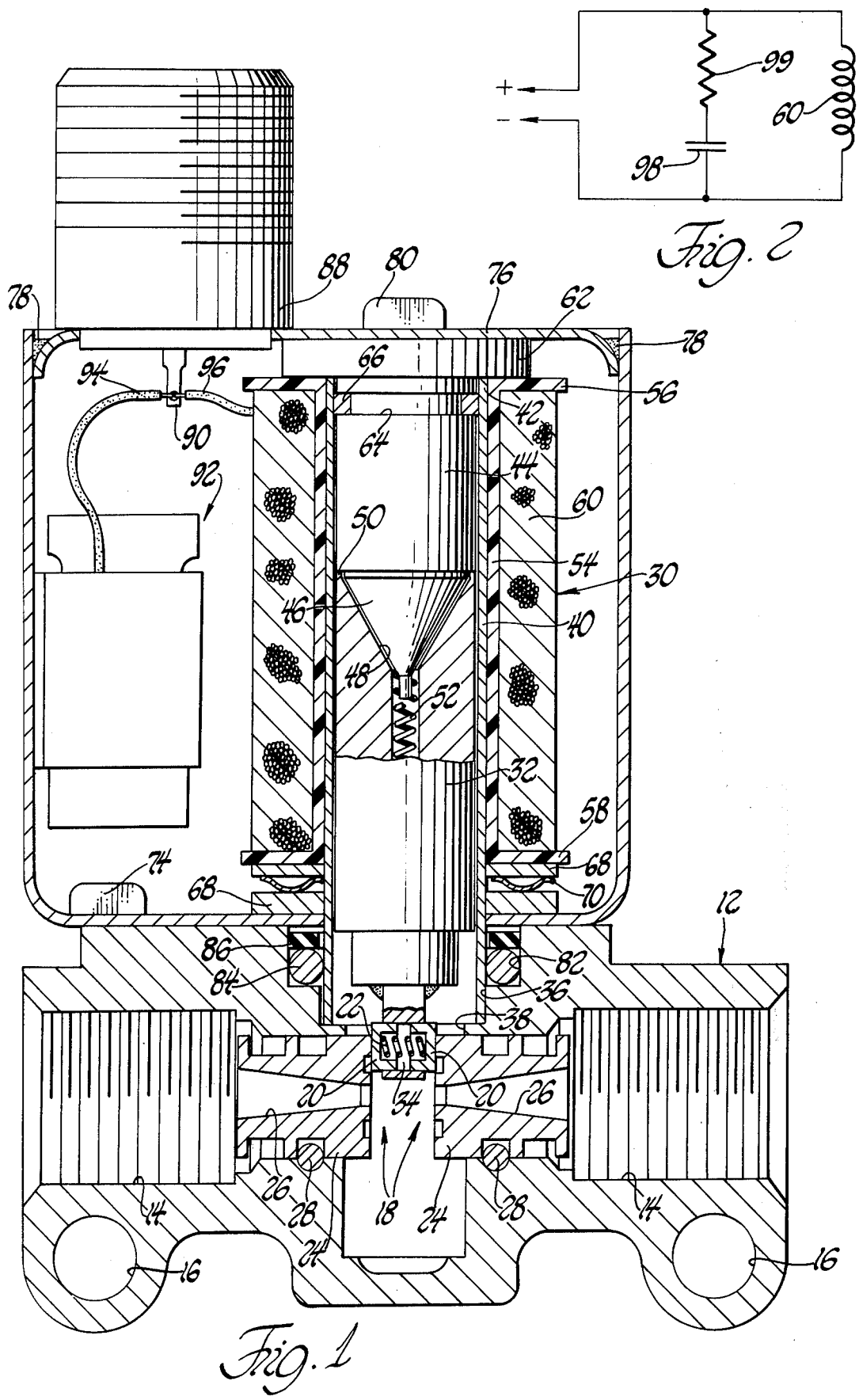

TIME DELAY SOLENOID OPERATED VALVE

The subject invention relates to a valve assembly of the type for controlling fluid flow through a passage. The valve assembly of the subject invention is particularly well suited for use in association with a jet engine for controlling the flow of fluid to the jet engine. More specifically, the valve assembly of the subject invention includes an inlet passage and an outlet passage with a valve means movable between open and closed positions for controlling the fluid flow through the passages. The valve means includes a solenoid actuated plunger which is moved by the magnetic field generated by an electrically operated coil of the solenoid. Typically, such valve assemblies are utilized to shut off the flow of fluid through the passages when electrical power is terminated to the coil of the solenoid as a result of the plunger thereof being biased to the closed position.

The subject valve assembly represents an improvement over the valve assembly disclosed in U.S. Pat. No. 2,750,962 granted June 19, 1956 to Morton A. Kreitchman, Benjamin F. Welt and Murray Maslow.

One of the problems with the prior art valve assemblies is that there can be an inadvertent loss of electrical power for short time periods as measured in milliseconds and during which it is undesirable to allow the valve to move to the closed position. This problem can be solved by the use of electrical circuits including associated with the solenoid to provide a time delay in allowing the plunger of the solenoid to move to the closed position after the termination of electrical power. Unfortunately, such time delay devices have not proven satisfactory because they do not provide a long enough period of time for the time delay.

This problem is solved in accordance with the subject invention which provides a valve assembly having valve means movable between open and closed positions by electrically operated means which is actuated as a result of electrical power being applied thereto and including circuit means for maintaining the electrically operated means actuated for a predetermined period of time immediately after the termination of electrical power applied thereto, with the circuit means including an electrical energy storage means and an electrical current resistance means in parallel with the electrically operated means.

In a more specific sense, the energy storage means is in series with the electrical resistance means so that electrical energy flows through the resistance means to the energy storage means when electrical power is applied to the electrically operated means and thereafter flows from the energy storage means through the resistance means to the electrically operated means during the predetermined period of delay.

In accordance with another novel aspect of the subject invention, the valve includes a plunger having a bore therethrough with a pair of sealing elements slidably disposed in the bore with biasing means biasing the elements apart and into engagement with adjacent valve seat members which are disposed in the passages on either side of the plunger whereby the sealing elements cover ports extending through the valve seat members to control fluid flow therethrough.

Yet another novel aspect of the subject invention is the provision of a solenoid operated valve assembly including a unique combination of components including a housing having a counterbore extending transversely to the fluid passages therethrough with a nonmagnetic tube disposed in the counterbore for slidably supporting the plunger of the solenoid and a plunger seat which is secured to the tube in the other end thereof for engaging and limiting movement of the plunger with biasing means reacting between the plunger and the plunger seat.

Other advantages of the present invention will be readily appreciated as the same becomes better understood by reference to the following detailed description when considered in connection with the accompanying drawings wherein:

FIG. 1 is a cross-sectional view of a preferred embodiment of the subject invention; and FIG. 2 is a schematic view of a circuit means for providing a time delay in the subject invention.

A valve assembly constructed in accordance with the subject invention is shown in FIG. 1. The valve assembly includes a valve housing generally indicated at 12. The housing 12 defines inlet and outlet passages 14 which communicate with one another and extend therethrough. The passages 14 are threaded for receiving fluid line connections. The housing 12 is preferably an aluminum casting. The housing includes the mounting holes 16 extending therethrough for mounting the assembly to a support structure.

The assembly also includes valve means generally shown at 18. The valve means 18 is movable between an open position, as illustrated, for allowing fluid flow through the passages 14, and a closed position for preventing fluid flow through the passages 14. The valve means 18 includes a pair of sealing elements 20 which are biased apart by a biasing means or spring 22. The valve means 18 also includes the valve seat members 24 which are disposed in the passages 14 on either side of the sealing elements 20 and are in engagement with the sealing elements 20. The valve seat members 24 have ports 26 extending therethrough and the sealing elements 20 cover the ports 26 when in the closed position. The seat members 24 have annular grooves extending thereabout through which the pins 28 extend for axially positioning the members 24. It will be appreciated that the pins 28 may extend tangentially to the members 24 at any position circumferentially thereabout. In other words, the pins 28 may be disposed at a position perpendicular or at 90° to the position in which they are illustrated.

The valve assembly also includes electrically operated means comprising a solenoid assembly generally indicated at 30. The electrically operated means or solenoid assembly 30 moves the sealing elements 20 of the valve means 18 from the closed position to the open position upon the actuation thereof resulting from electrical power being applied thereto. Specifically, the solenoid assembly 30 includes a plunger 32 which includes a circular bore 34 extending transversely through the lower or distal end thereof. The sealing elements 20 are slidably disposed in the bore 34 and are biased into or against the planar faces of the valve members 24 by the spring 22.

The housing 12 includes a counterbore 36 which extends perpendicularly or transversely to the passages 14 and includes an annular bottom or shelf with an opening 38 extending therethrough. A nonmagnetic tube 40 made of stainless steel has its first or lower end disposed in the counterbore 36 and in engagement with the bottom thereof. The tube 40 extends from its lower end upwardly to a second or upper end 42. The plunger 32 is slidably disposed in the tube 42 and, since the tube 42 is nonmagnetic, the plunger 32 is not magnetically attracted to the tube 40.

A plunger seat 44 is disposed in the second end of 42 of the tube 40 for engaging and limiting movement of the plunger 32 in the open position as illustrated. More specifically, the lower end of the plunger seat includes a conical guide portion 46 which is disposed within a female conical guide portion 48 in the plunger 32. The outer periphery of the plunger 32 abuts and engages the outer periphery of the plunger seat 44 at the mating surfaces 50 when the plunger 32 is in the open position illustrated. When the plunger 32 is in the open position illustrated, there is a space between the conical surfaces 46 and 48. A spring 52 moves the plunger 32 from the open position illustrated to the closed position with the sealing elements 20 covering the ports 26 in the members 24 when the solenoid assembly 30 is not actuated.

The solenoid assembly 30 includes a plastic bobbin 54 within flanges 56 and 58 extending radially from the ends thereof and surrounding the tube 42. An electrical coil 60 is disposed about the bobbin between the flanges 56 and 58 thereof and, when electrically energized, provides a magnetic field acting upon the plunger 32 to pull the plunger 32 against or into seating engagement with the plunger seat member 44.

The plunger seat member 44 includes an integral head 62 which engages the upper or second end 42 of the tube 40 as well as the upper flange 56 of the bobbin 54. The plunger seat member 44 also includes a groove 64 extending circumferentially thereabout at a position spaced downwardly from the head 62 and includes a welding metal such as solder 66 disposed in the groove and welding the plunger seat member 44 to the tube 40. In fabrication, a coil of solder is disposed in the groove 64 and the plunger seat member 44 is disposed within the tube 40. Thereafter, the end of the assembly is heated to melt the solder 66 so that the solder fills the groove 64 and unites or welds the plunger seat member 44 to the tube 40.

A pair of spacer washers 68 are disposed at the bottom of the bobbin 54 and a resilient means comprising the wave-like washer 70 is disposed therebetween for reacting against the end flange 58 of the lower end of the bobbin 54 for urging the bobbin 54 against the head 62 of the plunger seat member 44. A rectangular casing 72 is disposed upon the housing 12 and connected thereto by bolts or fasteners, one of which is shown at 74. The casing is generally rectangular in configuration, surrounds the solenoid assembly 30 and includes a cover 76. The casing includes a circular aperture or hole about the lower end of the coil and above the counterbore 36. The cover 76 is a separate member which, when assembled, is soldered in position by the solder weld 78. The cover 76 engages the head 62 of the plunger seat member 44 and is secured thereto by a threaded fastener means 80 which extends through a hole in the cover 76 and threadedly engages the plunger seat member 44.

The housing 12 also includes a recess 82 in the counterbore 36 about the tube 40. A seal means comprising the O-ring seal 84 is disposed in the recess 82 and is in sealing engagement with the tube 40. There is also included a plastic guide ring or washer 86 which could be engaged by the edge of the casing 72 as it extends over the recess 82. In other words, the periphery of the casing defining the aperture surrounding the tube 40 is cantilevered over the recess 82 and, in the event it is bent thereinto, the guide ring 86 will be engaged thereby to protect the seal 84.

The various components making up the solenoid assembly 30 are constructed so as to facilitate the assembly thereof. The plunger seat member 44 is secured to the tube 40, as explained above, by solder 66 welding the two members together with the head 62 engaging the top end of 42 of the tubular member 42. The tubular member 40 with the plunger seat member 44 secured thereto and the plunger 32 slidably disposed therein and the bobbin 54 and the washer 68 and 70 in position are assembled with the tube 40 having its lower end inserted through the aperture in the casing and into the counterbore 36 with the seal 84 and the guide ring 86 in position. Of course, the casing 72 has previously been connected to the housing 12 by the bolts 74. Thereafter, the cover 76 is connected to the head portion 62 by the bolt 80. The cover 86 is forced downwardly so that the head 62 engages the top end 42 of the tube 40 and the top flange 56 of the bobbin 54 to move the bottom end of the tube 40 into engagement with the bottom of the counterbore 36 and to compress the resilient wave-like washer 70. Subsequently, solder 78 is placed in position to secure the cover 76 to the casing 72. The casing 72 and the cover 76 are low cost carbon steel which are magnetic but are coated in tin so that they are more easily soldered together.

A connector member 88 is supported on the cover 76 of the casing 72 and includes an electrical terminal 90 disposed within the casing. The bottom of the connector 88 as well as the cover 76 and the casing 72, the washers 68, plunger 32 and plunger seat member 44, are all magnetic and provide a magnetic path.

The assembly also includes a circuit means generally shown at 92 in FIG. 1 and shown schematically in FIG. 2. The circuit means 92 is connected to the terminal 90 through leads 94 and the terminal 90 is also connected to the coil 60 of the solenoid through lead 96. It will be appreciated that various terminals 90 and leads may be utilized.

The circuit means 92, as illustrated in FIG. 2, maintains the electrically operated solenoid assembly 30 actuated for a predetermined period of time immediately after the termination of electrical power applied thereto. More specifically, electrical power is supplied through the connector 88 to the coil 60 of the solenoid assembly 30 to move the plunger 32 to the open position illustrated against the biasing action of the spring 52. Normally, upon the termination of such electrical power applied to the solenoid coil 60, the plunger 32 would immediately move under the biasing action of the spring 52 to the closed position covering the ports 26 in the seating members 24. As alluded to above, it frequently occurs that electrical power may be terminated for very short periods of time such as milliseconds and it is not desirable to allow the valve to close in such circumstances. Accordingly, the circuit means 92 provides a time delay after the termination of electrical power for preventing the plunger 32 from moving to the closed position in the event electrical power is restored within that time delay period. Specifically, the circuit means 92, as illustrated in FIG. 2, includes an electrical energy storage means comprising the capacitor 98 and an electrical current resistance means comprising the resistor 99 which are in parallel circuitry with the solenoid 60. The capacitor 98 is in series with the resistor 99 with the resistor 99 forward of the capacitor 98 so that electrical energy flows through the resistor 99 to the capacitor 98 when electrical power is applied to the coil 60 of the solenoid and thereafter flows from the capacitor 98 through the resistor 99 to the coil 60 of the solenoid during the predetermined time delay period after electrical power has been terminated. As will be appreciated, the capacitor 98 charges as electrical power is supplied to the coil 60 of the solenoid to actuate the solenoid assembly 30 to move the plunger 32 to the open position. Once that electrical power is terminated to the coil 60, however, the capacitor 98 discharges through the resistor 99 to maintain the coil 60 energized and the solenoid assembly 30 actuated until the capacitor 98 is drained of its energy. The resistor 99 controls the discharge of the capacitor 98 to the coil 60 thereby extending or lengthening the delayed period.

The resistance in ohms of the resistor 99 is greater than the resistance in ohms of the coil 60 of the solenoid. Specifically, resistance of the resistor 99 is between six and nine times the magnitude of the resistance of the coil 60 of the solenoid. In a preferred embodiment, the resistor 99 has a resistance of approximately 30 ohms whereas the resistance of the coil 60 is approximately 220 ohms. Also, in the preferred embodiment the capacitor is one of approximately 440 micro-farads.

Electrical energy expended in moving the plunger 32 from the closed position to the open position illustrated in FIG. 1 is significantly greater than the electrical energy which is necessarily expended in maintaining the plunger 32 in the open position illustrated. As an example, it would require approximately 7 volts for moving the plunger 32 from the closed to the open position and since the current equals the voltage divided by the resistance and the resistance of the coil 60 is 30 ohms, the current necessary for initially moving the plunger would equal approximately 233 milliamps. On the other hand, it requires only approximately 2 volts for maintaining the plunger 32 in the open position illustrated in FIG. 1 and therefore the current necessary for holding the plunger 32 in the open position is approximately 66 milliamps. In this example the plunger 32 will be maintained in the open position until the current in the coil 60 drops below 66 milliamps. The typical voltage supplied by the power supply is 24 volt DC on a continuous basis. Thus, the capacitor, when fully charged, is charged to 24 volts. The current available is, therefore, the 24 volts of the capacitor divided by the resistance of the resistor 90 and resistance of the coil 60 which is 250 ohms divided into 24 volts which is approximately 96 milliamps, which is significantly higher than the 66 milliamps required for maintaining the plunger in the open position. As will be appreciated, the resistor 99 limits the current discharge from the capacitor 98 through the coil 60 of the solenoid assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A valve assembly comprising; a valve housing defining an inlet passage and an outlet passage in communication therewith, valve means movable between an open position for allowing fluid flow through said passages and a closed position for preventing fluid flow through said passages, electrically operated means for moving said valve means from one of said positions to the other position upon the actuation thereof resulting from electrical power being applied thereto, and circuit means for maintaining said electrically operated means actuated for a predetermined period of time immediately after the termination of electrical power applied thereto, said circuit means including electrical energy storage means and electrical current resistance means in parallel with said electrically operated means, said housing including a counterbore extending transversely to said passages, a nonmagnetic tube having a first end disposed in said counterbore and extending therefrom to a second end, said plunger being slidably disposed in said tube, a plunger seat disposed in said second end of said tube for engaging and limiting movement of said plunger in said open position, biasing means reacting between said plunger and said plunger seat, said electrically operated means including a plastic bobbin with end flanges extending from the ends thereof and surrounding said tube and a coil disposed thereabout, said plunger seat includes a head engaging said second end of said tube and one of said end flanges of said bobbin, resilient means reacting against the end flange at the other end of said bobbin for urging said bobbin against said head of said plunger seat, a casing disposed on said housing and surrounding said solenoid, said casing including a cover engaging said head of said plunger seat, said plunger seat being secured to said tube.

2. An assembly as set forth in claim 1 wherein said energy storage means is in series with said resistance means.

3. An assembly as set forth in claim 2 wherein electrical energy flows through said resistance means to said energy storage means when electrical power is applied to said electrically operated means and flows from said energy storage means through said resistance means to said electrically operated means during said predetermined period.

4. An assembly as set forth in claim 3 wherein said energy storage means comprises a capacitor.

5. An assembly as set forth in claim 4 wherein said resistance means comprises a resistor.

6. An assembly as set forth in claim 5 wherein said electrically operated means comprises a solenoid assembly.

7. An assembly as set forth in claim 6 wherein the resistance in ohms of said resistor is greater than the resistance in ohms of said solenoid.

8. An assembly as set forth in claim 7 wherein the resistance of said resistor is between six and nine times the magnitude of the resistance of said solenoid.

9. An assembly as set forth in claim 8 wherein said solenoid assembly includes a plunger having a bore through the distal end thereof and said valve means includes a pair of sealing elements slidably disposed in said bore, biasing means biasing said elements apart, and valve seat members disposed in said passages on either side of said plunger and engaging said sealing elements, said valve seat members having ports therethrough and said sealing elements cover said ports in said closed position.

10. An assembly as set forth in claim 9 including spring means for moving said plunger from said open position to said closed position when said solenoid is not actuated.

11. A valve assembly comprising: a valve housing defining an inlet passage and an outlet passage in communication therewith; valve means movable between an open position for allowing fluid flow through said passages and a closed position for preventing fluid flow through said passages; a plunger having a bore therethrough; said valve means including a pair of sealing elements slidably disposed in said bore, biasing means biasing said elements apart, and valve seat members disposed in said passages on either side of said plunger and engaging said sealing elements, said valve seat members having ports therethrough and said sealing elements cover said ports in said closed position, said housing including a counterbore extending transversely to said passages, a nonmagnetic tube having a first end disposed in said counterbore and extending therefrom to a second end, said plunger being slidably disposed in said tube, a plunger seat disposed in said second end of said tube for engaging and limiting movement of said plunger in said open position, biasing means reacting between said plunger and said plunger seat, a solenoid including a plastic bobbin with end flanges extending from the ends thereof and surrounding said tube and a coil disposed thereabout, said plunger seat including a head engaging said second end of said tube and one of said end flanges of said bobbin, resilient means reacting against the end flange at the other end of said bobbin for urging said bobbin against said head of said plunger seat, a casing disposed on said housing and surrounding said solenoid, said casing including a cover engaging said head of said plunger seat, said plunger being secured to said tube.

12. A valve assembly comprising: a valve housing defining an inlet passage and an outlet passage in communication therewith, valve means movable between an open position for allowing fluid flow through said passages and a closed position for preventing fluid flow through said passages, a solenoid including a plunger for moving said valve means from one of said positions to the other position upon the actuation thereof resulting from electrical power being applied thereto, said housing having a counterbore extending transversely to said passages, a nonmagnetic tube having a first end disposed in said counterbore and extending therefrom to a second end, said plunger being slidably disposed in said tube, a plunger seat disposed in said second end of said tube for engaging and limiting movement of said plunger in said open position, and biasing means reacting between said plunger and said plunger seat, said solenoid including a plastic bobbin with end flanges extending from the ends thereof and surrounding said tube and a coil disposed about said bobbin between said end flanges, said plunger seat including a head engaging said second end of said tube and one of said end flanges of said bobbin, resilient means reacting against the end flange at the other end of said bobbin for urging said bobbin against said head of said plunger seat, a casing disposed about said solenoid, said casing including a cover engaging said head of said plunger seat, said plunger being secured to said tube.

13. A valve assembly comprising: a valve housing defining an inlet passage and an outlet passage in communication therewith, valve means movable between an open position for allowing fluid flow through said passages and a closed position for preventing fluid flow through said passages, a solenoid including a plunger for moving said valve means from one of said positions to the other position upon the actuation thereof resulting from electrical power being applied thereto, said housing having a counterbore extending transversely to said passages, a nonmagnetic tube having a first end disposed in said counterbore and extending therefrom to a second end, said plunger being slidably disposed in said tube, a plunger seat disposed in said second end of said tube for engaging and limiting movement of said plunger in said open position, and biasing means reacting between said plunger and said plunger seat, said solenoid including coil means disposed about said tube, said plunger seat includes a head engaging said second end of said tube and said coil means, and resilient means reacting against the other end of said coil means for urging said coil means against said head of said plunger seat.

14. An assembly as set forth in claim 13 wherein said plunger seat includes a groove extending thereabout at a position spaced from said head thereof and including a welding metal disposed in said groove and welding said plunger seat to said tube.

15. An assembly as set forth in claim 14 including a casing disposed on said housing and surrounding said coil, said casing having an aperture therein surrounding said tube, said casing including a cover engaging said head of said plunger seat.

16. An assembly as set forth in claim 15 including threaded fastener means threadedly engaging said plunger seat and extending through said cover to retain said cover on said head thereof.

17. An assembly as set forth in claim 15 including a spacer washer disposed about said tube and disposed upon said casing, said resilient means comprising a wave washer disposed on said spacer washer, said solenoid including a plastic bobbin with end flanges engaging said wave washer and said head respectively and disposed about said tube.

18. An assembly as set forth in claim 17 wherein said housing includes a recess in said counterbore about said tube and including seal means disposed in said recess and engaging said tube.

* * * * *